3,836,642
GRANATICIN B AND METHOD OF PREPARING SAME

Walter Keller, Dubendorf, Zurich, Switzerland, and Hans Zaehner, Tubingen, Germany, assignors to Ciba-Geigy Corporation, Ardsley, N.Y.
Filed Feb. 15, 1967, Ser. No. 616,345
Claims priority, application Switzerland, Feb. 22, 1966, 2,510/66
Int. Cl. A61k *21/00*
U.S. Cl. 424—121        2 Claims

ABSTRACT OF THE DISCLOSURE

The antibiotic Granaticin B, a red substance having the empirical formula $C_{28}H_{30}O_{12}$, molecular weight 558, yielding on acid hydrolysis granaticin of empirical formula $C_{22}H_{20}O_{10}$ and a trideoxyhexose $C_6H_{12}O_3$ (L-rhodinose).

SUMMARY OF THE INVENTION

Figure 1:
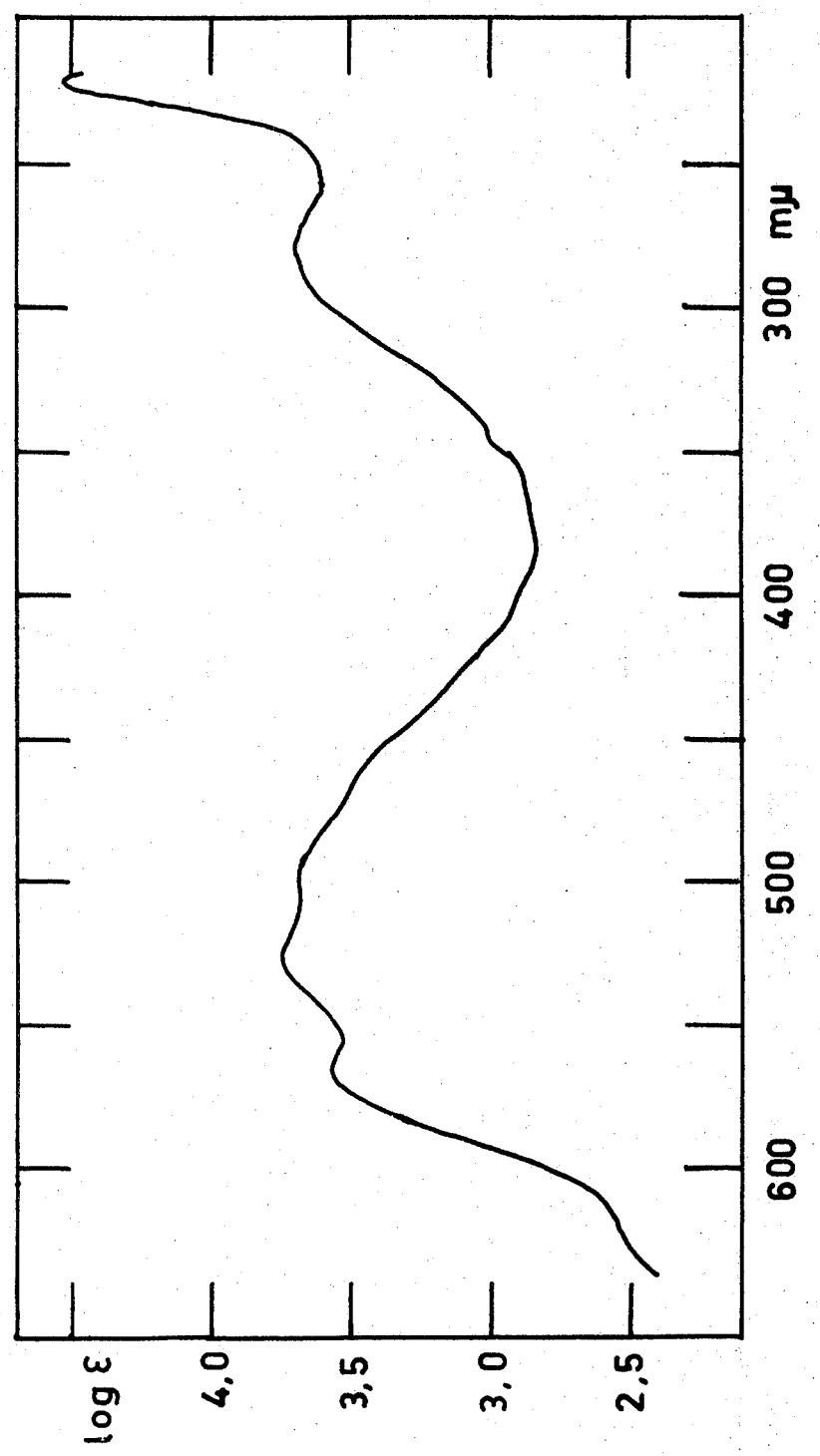

The subject of the invention is a new antibiotic which is subsequently referred to as Granaticin B, its derivatives, for instance esters, especially lower alkanoyl esters, and degradation products, especially the sugar L-rhodinose and its derivatives, for instance esters such as lower alkanoyl esters, and ethers for instance lower alkyl ethers, oximes and hydrazones and a process for the manufacture of these compounds.

The new antibiotic is formed in the culture of a strain of Streptomycetes which is stored in our laboratories under the designation 11 382, and in the United States Department of Agriculture, Peoria, Ill., under the description NRRL 3262.

DESCRIPTION OF THE PREFERRED EMBODIMENTS

The strain 11 382 was isolated from a sample of soil taken near Heiden, Canton of Appenzell, Switzerland. According to the characteristics which determine the type it belongs to the type Streptomycetes violaceoruber (Waksman et Curtis) Waksman sensu Waksman et Kutzner 1959. The strain is characterized by the following features:

1. The ellipsoidal spores are 0.6 to 1.2 by 0.6 to 1.1μ in size; their surface is smooth or slightly warty;
2. The air mycelium is initially chalky-white to pinkish white or greyish white, later often pale crimson to cinnamon brown, and of ash grey color in the ripened state (cinereus);
3. The air mycelium is monopodially branched with short, more or less regular spirals or loops having 1 to 3, rarely up to 5, turns in the lateral branches;
4. No melamine-type pigment is formed on nutrients containing peptone;
5. The substrate mycelium is whitish yellow, pale yellowish red, red brown to reddish blue, reddish violet or blue-violet.

Growth on various media

1. Mineral substratum according to Gause et al. (Classification Problems of Actinomycetes-Antagonists (Russian), Nat. Ed. Med. Lit. Medzig, Moscow, 1957): Growth initially punctiform, later thinly cloudy, whitish yellow with isolated black-brown spots in old cultures; air mycelium absent or very scarce; substratum dark-blue to blue-violet.

2. Peptone-iron-agar (J. Bacteriol. 76, 239 (1958)): growth pustular to thinly cloudy, whitish yellow; air mycelium lacking; substratum with slight blue-violet coloration; no melamin formation.

3. Yeast extract/malt extract/agar (Pridham et al. Antiobiot. Ann. 1956/67, p. 947). Growth initially pustular, later thinly cloudy to wrinkled, pale yellowish red to blue-violet, air mycelium initially forming a dusty coating, white as flour, subsequently velvety and, because of the colors of the substrate mycelium and of the substrate shining through, pale crimson and at some spots pale gray to slightly ash gray; substrate intensively blue violet.

4. Nitrate broth (Manual of Methods of Pure Culture Study of Bacteria, Committee on Bacteriological Technique of Soc. Amer. Bact. Biotechn. Publ. Geneva, N.Y. 44–9–10 (1946): Growth at bottom spotty, whitish yellow; very slight reduction of the nitrates, even after 10 days.

5. Gelatin stab (cultivation at 37° C. Lindenbein, W. Arch. Mikrobiol. *17*, 361 (1952)): At first floating growth to surface skin, chalky white, later little additional bottom growth; substratum slightly blue-violet; liquefaction after 4 days=0; after 8 days=trace to 1 cm.

6. Starch agar (Lindenbein, l.c.): growth thinly cloudy, initially grayish white like flour, later whitish yellow to spotty pale blue violet, air mycelium either lacking entirely or very sparse; substratum blue violet; hydrolysis after 8 days: small trace.

7. Thioglycollate medium (Difco Manual, 9th edition, Difco Lab. Inc., Detroit, 1962, p. 199): no anaerobic growth detectable.

8. Oatmeal agar (Pridham et al., l.c.): growth pustular to wrinkly, red-brown to blue-violet; air mycelium forming a dusty coating to (later on) becoming cloudy, milky white, whitish gray, pale crimson to ash-grey; substratum blue-violet.

9. Yeast extract solution (composition the same as yeast extract agar, but without agar: incubation at 50° C.): slow, whitish yellow growth; no thermophily detectable. Utilization of carbon sources (cf. Pridham, T. G., and D. Gottlieb; J. Bacteriol. 56, 107 (1948): —=no growth; (—)=very sparse growth; (+)=definitely ascertainable, but slow growth; +=good growth.

| Source of carbon | Growth |
|---|---|
| Negative control | — |
| d-Glucose | + |
| l-Arabinose | + |
| Saccharose | (+) |
| d-Xylose | + |
| Mesoinosite | (—) |
| d-Mannitol | + |
| d-Fructose | (+) |

The antibiotic Granaticin B is formed on culturing the strain 11 382 or other strains showing essentially the same properties. In order to manufacture Granaticin B, S. violaceoruber 11 382 or other micro-organisms showing these properties are cultured in an aqueous nutrient solution containing a source of carbon and nitrogen as well as inorganic salts, until the nutrient solution shows a significant antibacterial effect, and the antibiotic Granaticin B is then isolated and, if desired, is converted to its derivatives for instance esters, especially lower alkanoyl esters or degradation products, especially those obtained on acid hydrolysis, viz. the antibiotic granaticin $C_{22}H_{20}O_{10}$ and the sugar component L-rhodinose of the formula $C_6H_{12}O_3$.

The following may for example be used as carbon and nitrogen sources in culture: glucose, starch, mannitol, amino-acids, for example glycine, peptides, proteins and their degradation products such as peptone or tryptone, meat extracts, water soluble components of grain such as maize or wheat, distillation residues from the manufacture of alcohol, corn steep liquor, yeast, seeds, especially rape seed, soya seed and cotton seed, ammonium salts and nitrates. As inorganic salts, the nutrient solution may for example contain chlorides, carbonates, nitrates and phosphates of alkali metals, alkaline earth metals, magnesium, zinc, manganese and iron.

The culture is carried out aerobically, for example in a static surface culture, or is preferably carried out submerged, with shaking or stirring in air or oxygen in shaking flasks or known fermenters. A suitable temperature is between 27 and 40° C. The nutrient solution generally shows a significant antibacterial effect after 2–5 days. The culture is preferably carried out in several stages, that is to say a pre-culture is first prepared in a liquid nutrient medium, and this is then trans-inoculated to the actual production medium, for example in the ratio 1:10. The pre-culture is for example obtained by trans-inoculating a spore mycelium obtained by about 14 days growth on a solid nutrient (agar), to a liquid medium, and allowing this to grow for 96 hours. A suitable test of antibacterial effect is the plate diffusion test with *Bacillus subtilis* or *Staphylococcus aureaus*.

The antibiotic is isolated from the culture medium by methods which are in themselves known, taking into account the chemical, physical and biological properties of the antibiotic, for example by extraction of the culture filtrate with an organic solvent which is only slightly miscible with water, for example ethyl acetate, and further enrichment, for example by counter-current distribution.

The antibiotic Granaticin B is a luminous red powder which cannot be crystallised. The yellow tetraacetyl derivative was obtained in a crystalline form. Analyses of the tetraacetyl derivative, and examination of the molecular mass spectrum (cf. Ardenne et al., Experienta 19, 178 [1963]) ascrbie to the Granaticin B the empirical formula $C_{28}H_{30}O_{12}$; molecular weight 558. From the NHR spectrum it is possible to conclude that in the tetraacetyl derivative two alcoholic hydroxyl groups and two phenolic hydroxyl groups are esterified; singlets of three protons are present at δ 2.08, 2.18, 2.45 and 2.47 p.p.m. In acid solution, the Granaticin B changes by hydrolysis to a compound of empirical formula $C_{22}H_{20}O_{10}$, molecular weight 444. The compound having this formula is the antibiotic Granaticin which has been described by Corbaz et al. in Helv. Chim. Acta 40, 1262–1269 (1957). Granaticin and Granaticin B differ by the residue $C_6H_{10}O_2$, molecular weight 114. It can be shown that the eliminated residue is a tridesoxyhexose $C_6H_{12}O_3$. Granaticin B is thus a glycoside of Granaticin. On acid-catalysed methanolysis one obtains a methylated sugar of composition $C_7H_{14}O_3$ whose NHR spectrum shows signals to be expected for a 5-methyl-didesoxyaldopentose. The signals are however more complex than in a mixture of two anomeric glycosides. Thus, above all, the signal of the C—CH$_3$ group shows, in addition to a strong doublet at δ 1.19 p.p.m. two considerably weaker doublets with the same coupling constant (J=6.5 c.p.s.) at δ 1.17 and 1.26 p.p.m., and the O-methyl signal at δ 3.37 p.p.m. has two weaker companions at δ 3.35 and 3.43 p.p.m. This multiplicity of the signals can only be understood if it is assumed that the mixture contains at least one furanoside in addition to the two anomeric pyranosides. In accordance with this the sugar component of the Granaticin B is a 2,3,6-tridesoxyhexose. This also follows from the fact that on reducing the free sugar to the sugar alcohol and oxidation thereof with sodium periodate, acetaldehyde is formed. In order to ascertain which of the four possible stereomeric configurations of the sugar component apply to the Granaticin B, the 2,4-dinitrophenylhydrazone of the sugar from Granaticin B was prepared. This has a melting point of 117–119° C. which agrees well with that of the 2,4-dinitrophenylhydrazone of synthetically produced D-rhodinose. The mass spectrum and thin film chromatogram are also identical. On the other hand the optical rotation is opposite to that of the comparison 2,4-dinitrophenylhydrazone. According to this the sugar component of Granaticin B is the L-rhodinose of formula

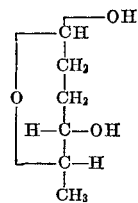

The absorption spectrum of Granaticin B in methanol, in the ultraviolet and visible range, essentially corresponds with that of Granaticin; it shows maxima at 223 (log ε=4.42); 285 (log ε=3.68), 498 (shoulder, log ε=3.71); 527 (log ε=3.76) and 566 (log ε=3.57) mμ, see FIG. 1. The infra red spectrum in potassium bromide shows, in the 6μ range, the same maxima as for Granaticin: 1785 cm.$^{-1}$ (γ-lactone); 1608 cm.$^{-1}$ (quinone carbonyls with strong intramolecular hydrogen bonds) and 1573 cm.$^{-1}$. On the other hand there are considerable differences in the fingerprint range, see FIG. 2. In the infra red spectrum of the tetraacetate in potassium bromide the bands in the 6μ range at 1780 cm.$^{-1}$ are much broadened, since arylacetate groups are present additionally to the unchanged γ-lactone group. A new band at 1740 cm.$^{-1}$ is caused by the esterification of the alcoholic hydroxyl groups, and the band of the quinone carbonyls is displaced from 1608 to 1670 cm.$^{-1}$, since the carbonyl groups are no longer chelated by hydrogen bonds, see FIG. 3.

The strain 11382 also produces Granaticin alongside Granaticin B, whereas the strain described by Corbaz et al., Helv. Chim. Acta, loc. cit. does not produce any Granaticin B. Granaticin B can easily be distinguished from Granaticin by paper chromatography, for example by filter paper chromatography with benzene/formamide, in which Granaticin B shows a considerably higher $R_f$ value than Granaticin. The preparative separation may for example be carried out by counter-current distribution according to Craig.

Granaticin B is antibiotically active against gram-positive and gram-negative micro-organisms, for example staphylococci, such as *Staphylococcus pyogenes aureus*, streptococci, such as *Streptococcus faecalis*, Pasteurella, *Vibrio comma* and others. It may therefore be used for combatting infections caused by such micro-organisms. It may furthermore be used as a disinfectant, as a preservative in foodstuffs, or as a fodder additive.

When used as medicine, the antibiotic is employed in the form of pharmaceutical preparations. These contain the compound in question, mixed with a pharmaceutical organic or inorganic excipient suitable for enteral or parenteral administration. Possible substances for this are those which do not react with the new compounds, for example gelatine, lactose, starch, magnesium stearate, vegetable oils, benzyl alcohols or other known medicinal excipients. The pharmaceutical preparations may for example be in the form of tablets, dragées, powders, suppositories, or in a liquid form as solutions, suspension or emulsions. They may if desired be sterilised and/or contain auxiliary substances such as preservatives, stabilisers, detergents or emulsifier. They may also additionally contain other therapeutically valuable substances. The invention is described in the following Example.

Example 1

300 ml. of a nutrient solution in a 2 litre Erlenmeyer flask containing 20 g. of soya flour (full fat content) and 20 g. of mannitol per litre of tap water, is inoculated with an agar culture of streptomyces violaceoruber 11 382 and the suspension is incubated at 27° C. whilst being shaken on a shaking machine. After about 36 hours a pale violet colour manifests itself and on the fourth day the culture is a deep violet colour. The culture is now transferred in the ratio 1:10 to a nutrient solution of the same composition in a fermenter. The mixture is again incubated at 27° C. with intense aeration (corresponding to sulphite values of 80–100 mols $O_2$/litre/hour) for 2–4 days. On carrying out the plate diffusion test with *Bacillus subtilis* or *Straphylococcus aureus* Granaticin and Granaticin B show a different rise in different concentrations. The estimation of the content of Granaticin and Granaticin B may suitably be carried out by thin film chromatography using polyamide plates and ethyl acetate/benzene (80:20) as the running medium, $R_f$ value of Granaticin, 0.34–0.38; $R_f$ value of Granaticin B 0.76–0.78.

When the Granaticin B in the culture suspension has been significantly enriched, the culture is filtered with the addition of 2% of a filter aid, for example Hyflo-Supercel (registered trade mark). The culture filtrate is adjusted to pH 4–5 by means of hydrochloric acid and immediately extracted with ethyl acetate. The extracts are concentrated under mild conditions. About 50 g. of "crude extract" are obtained from 30 litres of culture. 55 g. of "crude extract" (pH 2–3) are distributed in a fully automatic distribution apparatus of the Craig type, through 380 stages, using the solvent system chloroform/carbon tetrachloride/methanol/water (55:55:75:25). The photometric determination at 530 mμ gives a distribution curve having two approximately equal sized maxima in stages 88 ($k_1$=0.30) and 136 ($k_2$=0.56) and a minimum in stage 116. The curves of antibiotic activity determined by the agar diffusion test with *Bacillus subtilis* and *Staphylococcus aureus* run parallel to the optical curve.

In order to isolate the Granaticin B the fractions 70–100 are combined, diluted with water, the non-polar phase is separated off, and the aqueous/methanolic layer is shaken three times with chloroform until it is colourless. The extracts which have been washed with water and dried over sodium sulphate on evaporation in vacuo yield 8.75 g. of an intensely red residue which, according to paper chromatography (filter paper chromatography with benzene/formamide), is solely Granaticin B; $R_f$=0.67. The product is obtained as a luminous red amorphous powder by reprecipitation from ethyl acetate/petrol ether.

Figure 2:
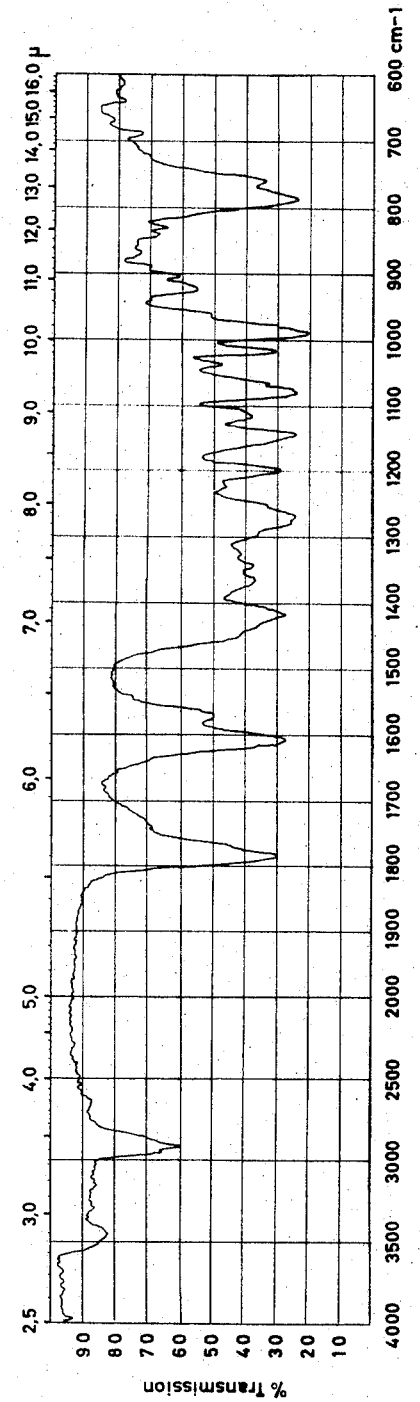

The absorption spectrum in ethanol in the ultraviolet and in the visible is represented in FIG. 1 and the infra red spectrum in potassium bromide is shown in FIG. 2. The mass spectrum according to Ardenne et al., loc. cit., shows a molecular ion m/e 558 (calculated for $C_{23}H_{30}O_{12}$, 558). No molecular ion is observed in the usual mass spectroscopy using positive ions.

In the same manner, 5.02 g. of a mixture of Granaticin B and Granaticin are obtained from fractions 101–120 of the Craig partition. The fractions 121–150 yield Granaticin, $R_f$=0.32.

Figure 3:
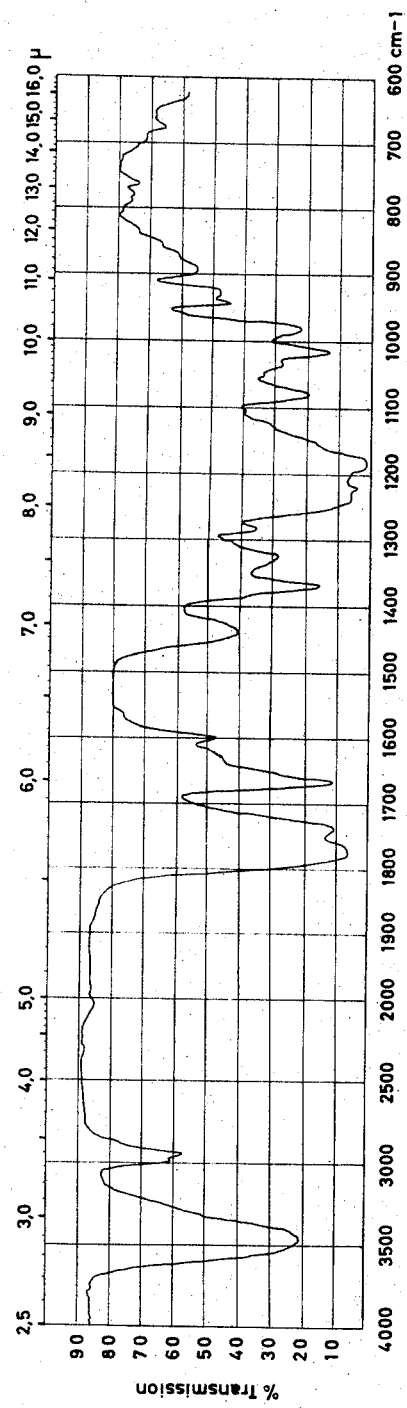

100 mg. of Granaticin B are warmed for 5 minutes on a steam bath with 12 ml. of acetic anhydride and 3 ml. of pyridine, and then allowed to stand for 16 hours at 20°. After adding ice, the solution is three times shaken with benzene and the benzene extract is washed with dilute hydrochloric acid and water. On evaporation in vacuo, a yellow residue of 117 mg. of Tetraacetyl-granaticin B is obtained and this is recrystallised from ethanol. Melting point 257–259°. The NMR spectrum in $CDCl_3$ shows, inter alia, 4 singlets of 3 protons at δ 2.08, 2.18, 2.45 and 2.47 p.p.m. FIG. 3 shows the infra red spectrum.

100 mg. of Granaticin B in 1 ml. of ethanol and 0.1 ml. of water are treated with 2 ml. of sulphuric acid and slowly warmed to 60°. After 20 minutes dark red crystals begin to precipitate from the clear solution. The mixture is allowed to stand for 1 hour at 20° and 15 hours at 0°, and the crystals are filtered off, washed and dried. They are identified as Granaticin by mixed melting point, paper chromatography, and ultraviolet and infra red spectra.

650 mg. of Granaticin B are dissolved in 100 ml. of 1,3 N absolute methanolic hydrochloric acid. After 30 minutes standing at 20° Granaticin separates out as a red crystalline precipitate. This is filtered, the filtrate neutralised with freshly precipitated silver carbonate, and the silver salts are separated off. The solution is evaporated in vacuo. 97 mg. of a colourless oil of methyl-L-rhodinoside of boiling point 0.01=80° are obtained. Elementary analysis yields the formula $C_6H_{14}O_3$. On thin film chromatography in the system n-butanol/ethyl acetate/water (4:1:1) a single spot, $R_f$=0.68, is obtained. The infra red spectrum shows a band (OH) at 3440 cm.$^{-1}$ and no maxima in the 6μ region. The NMR spectrum in $CDCl_3$ shows the following signals:

1.17 p.p.m., 1.19 p.p.m., 1.26 p.p.m. (3 doublets, J=6.5 c.p.s., altogether 3 H: $CH_3$ on C–5, at least 3 isomers);
1.5–2.1 p.p.m. (broad conglomeration of signals, 4 H: $CH_2$ in positions 2 and 3);
2.60 p.p.m. (broad singlet, 1 H: OH on C–4);
3.35 p.p.m., 3.37 p.p.m., 3.48 p.p.m. (3 singlets, altogether 3H: $OCH_3$, at least 3 isomers);
4.4–4.1 p.p.m. (broad conglomeration of signals, 2 H: H on C–4 and C–5);
4.7 p.p.m., 5.0 p.p.m. (broad conglomeration of signals, altogether 1 H: H on C–1).

50 mg. of methyl-L-rhodinoside are added to a hot solution of 82 mg. of 2,4-dinitrophenylhydrazine in 13 ml. of 2 N hydrochloric acid. A yellow precipitate immediately forms and is filtered off and washed with water. In order to purify it, the 2,4-dinitrophenylhydrazone is subjected to chromatography on silica gel using ethyl acetate as the diluent, and is then recrystallised four times from methanol. Melting point 117–119°; $[\alpha]_D^{22}$=–17.2° (c.=0.83 in pyridine). In a thin film chromatogram using the system ethyl acetate/methanol (8:2) the compound cannot be distinguished from a comparison sample obtained from synthetic D-rhodinose; the mass spectra are also identical.

67 mg. of methyl-L-rhodinoside are warmed for 3 hours to 80° in 5.5 ml. of dioxane and 7 ml. of 0.1 N sulphuric acid. The solution is then neutralised with barium carbonate and the filtrate is evaporated in vacuo. L-Rhodinose boils at 60° at 0.01 mm. Hg. The thin film chromatogram using the system chloroform/ethyl acetate (1:1) shows a single spot of $R_f$=0.14.

Degradation of L-rhodinose: 48 mg. of L-rhodinose in 7 ml. of dioxane are boiled for 2 hours with 200 mg. of lithium aluminium hydride in 20 ml. of dioxane. After decomposing the excess reagent with a little saturated aqueous sodium sulphate solution and drying over sodium sulphate, the mixture is evaporated in vacuo. The residue is taken up in 10 ml. of water and treated with 200 mg. of periodic acid. A slow stream of nitrogen is passed through the solution and trapped in a solution of 2,4-dinitrophenylhydrazine in 1 N sulphuric acid. On slowly warming the solution containing the periodic acid to 30–35°, a yellow precipitate which is the 2,4-dinitrophenylhydrazone of acetaldehyde begins to separate out in the trap. This precipitate is identified by mixed melting point, thin film chromatography and infra red spectrum.

On intraperitoneal administration, this antibiotic produced in some cases a marked inhibition of the growth of inoculation-induced adenocarcinoma E.O. 771 in rodents. Adenocarcinoma E.O. 771 in the mouse, for example, is 50% inhibited by a dose of 3 mg./kg. of the antibiotic.

What is claimed is:

1. The antibiotic Granaticin B, a red substance having the empirical formula $C_{28}H_{30}O_{12}$, molecular weight 558, having the absorption spectrum in methanol in the UV and visible range as shown in FIG. 1, having the IR spectrum in potassium bromide shown in FIG. 2, forming a trideoxyhexose $C_6H_{12}O_3$ as L-rhodinose whose 2,4-dinitrophenylhydrazone melts at 117–119° C. and has the optical rotation $[\alpha]_D^{22}=17.2°$ (c.=0.83 in pyridine) and yielding on acid hydrolysis granaticin of empirical formula $C_{22}H_{20}O_{10}$ and a trideoxyhexose $C_6H_{12}O_3$.

2. A process for the manufacture of the antibiotic Granaticin B, wherein the strain S. violaceoruber 11 382 (NRRL 3262) [or another micro-organism showing the same properties], is cultured in an aqueous nutrient solution containing a source of carbon and nitrogen as well as inorganic salts, until the nutrient solution shows a significant antibacterial effect, and the antibiotic Granaticin B is then isolated from the culture filtrate.

No references cited.

JEROME D. GOLDBERG, Primary Examiner

U.S. Cl. X.R.

195—80

UNITED STATES PATENT OFFICE
CERTIFICATE OF CORRECTION

PATENT NO. : 3,836,642
DATED : September 14, 1974
INVENTOR(S) : Walter Keller et al It is certified that error appears in the above-identified patent and that said Letters Patent are hereby corrected as shown below:

Column 7, line 2, "=17.2°" should be -- =-17.2° --.

Signed and sealed this 15th day of July 1975.

(SEAL)
Attest:

RUTH C. MASON
Attesting Officer

C. MARSHALL DANN
Commissioner of Patents
and Trademarks